United States Patent
Johri

(10) Patent No.: US 11,390,283 B2
(45) Date of Patent: Jul. 19, 2022

(54) SYSTEM AND METHOD FOR CONTROLLING VEHICLE DURING COAST

(71) Applicant: Ford Global Technologies, LLC, Dearborn, MI (US)

(72) Inventor: Rajit Johri, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 229 days.

(21) Appl. No.: 16/521,654

(22) Filed: Jul. 25, 2019

(65) Prior Publication Data

US 2021/0024073 A1 Jan. 28, 2021

(51) Int. Cl.

| | |
|---|---|
| *B60W 20/13* | (2016.01) |
| *B60W 30/18* | (2012.01) |
| *B60L 50/62* | (2019.01) |
| *B60W 20/40* | (2016.01) |
| *B60W 10/18* | (2012.01) |
| *B60K 6/48* | (2007.10) |

(Continued)

(52) U.S. Cl.
CPC ......... *B60W 30/18072* (2013.01); *B60K 6/48* (2013.01); *B60L 50/16* (2019.02); *B60L 50/62* (2019.02); *B60W 10/18* (2013.01); *B60W 20/13* (2016.01); *B60W 20/30* (2013.01); *B60W 20/40* (2013.01); *B60L 7/26* (2013.01); *B60L 2250/26* (2013.01); *B60W 2510/0638* (2013.01); *B60W 2540/10* (2013.01); *B60W 2540/12* (2013.01); *B60W 2540/16* (2013.01)

(58) Field of Classification Search
CPC ................. B60W 20/13; B60W 20/14; B60W 30/18072; B60W 30/18127; B60L 7/26; B60L 2260/30; B60L 7/18; B60L 50/16; B60L 2260/24; B60T 1/10; B60T 13/586; B60T 2270/611
See application file for complete search history.

(56) References Cited

U.S. PATENT DOCUMENTS

| | | | | |
|---|---|---|---|---|
| 5,412,251 | A * | 5/1995 | Furutani | B60W 10/26 290/16 |
| 5,941,328 | A * | 8/1999 | Lyons | B60W 20/13 180/65.1 |

(Continued)

FOREIGN PATENT DOCUMENTS

| | | | | |
|---|---|---|---|---|
| EP | 2105366 | A2 * | 9/2009 | ......... B60L 11/1861 |
| JP | 08154304 | A * | 6/1996 | ................ B60L 7/10 |

(Continued)

OTHER PUBLICATIONS

EPO machine translation of JP 09-135502 (original JP document published May 20, 1997) (Year: 1997).*

*Primary Examiner* — David A Testardi

(74) *Attorney, Agent, or Firm* — David B Kelley; Brooks Kushman P.C.

(57) ABSTRACT

A vehicle includes a traction battery and a powertrain. The powertrain including at least one traction motor electrically connected to the battery such that the traction motor discharges the battery when producing positive torque to propel the vehicle and recharges the battery when producing negative torque to slow the vehicle. A vehicle controller is programmed to execute coast (lift-pedal) controls that reduce the charge rate of the battery based on a ratio of energy capacity of the battery to kinetic energy of the vehicle.

15 Claims, 3 Drawing Sheets

(51) Int. Cl.
  *B60L 50/16* (2019.01)
  *B60W 20/30* (2016.01)
  *B60L 7/26* (2006.01)

(56) References Cited

U.S. PATENT DOCUMENTS

| | | | | |
|---|---|---|---|---|
| 6,484,833 | B1 * | 11/2002 | Chhaya | B60W 20/00 |
| | | | | 180/65.225 |
| 9,026,296 | B1 * | 5/2015 | Johri | B60W 20/10 |
| | | | | 701/22 |
| 9,738,268 | B1 | 8/2017 | Zhang et al. | |
| 10,076,959 | B2 | 9/2018 | Nakamura | |
| 2003/0184152 | A1 | 10/2003 | Cikanek et al. | |
| 2003/0184156 | A1 * | 10/2003 | Hilbert | B60K 6/365 |
| | | | | 303/152 |
| 2005/0151420 | A1 * | 7/2005 | Crombez | B60T 1/10 |
| | | | | 303/152 |
| 2009/0298641 | A1 * | 12/2009 | Boot | B60W 20/19 |
| | | | | 477/4 |
| 2011/0133920 | A1 * | 6/2011 | Meadors | B60W 30/1882 |
| | | | | 340/439 |
| 2013/0131901 | A1 * | 5/2013 | Yamagata | B60W 30/18127 |
| | | | | 701/22 |
| 2013/0173107 | A1 * | 7/2013 | Kokon | B60W 20/00 |
| | | | | 701/22 |
| 2013/0296130 | A1 * | 11/2013 | Banker | B60L 7/18 |
| | | | | 477/27 |
| 2014/0172211 | A1 * | 6/2014 | Kim | B60L 15/2009 |
| | | | | 701/22 |
| 2015/0224981 | A1 * | 8/2015 | Fujishiro | B60K 6/442 |
| | | | | 701/22 |
| 2016/0243947 | A1 * | 8/2016 | Perkins | B60L 58/20 |
| 2016/0257297 | A1 * | 9/2016 | Oshiumi | B60L 15/20 |
| 2016/0297408 | A1 * | 10/2016 | Gallagher | B60T 1/10 |
| 2017/0151954 | A1 * | 6/2017 | Hilton | B60W 10/24 |
| 2017/0232959 | A1 * | 8/2017 | Bureau | B60K 6/48 |
| | | | | 180/65.28 |
| 2018/0093572 | A1 * | 4/2018 | Hall | B60L 7/26 |

FOREIGN PATENT DOCUMENTS

| | | | | |
|---|---|---|---|---|
| JP | 09135502 A | * | 5/1997 | B60K 6/48 |
| JP | 2007253715 A | * | 10/2007 | |
| JP | 2012106536 A | * | 6/2012 | B60K 6/48 |
| JP | 2016144977 A | * | 8/2016 | B60L 7/10 |

* cited by examiner

SYSTEM AND METHOD FOR CONTROLLING VEHICLE DURING COAST

TECHNICAL FIELD

The present disclosure relates to controlling electrified vehicle powertrains and more specifically to controlling the powertrain of the vehicle during coast based on a battery state of charge.

BACKGROUND

A moving vehicle will coast when both the accelerator pedal and the brake pedal are released. In a conventional vehicle, the internal combustion engine produces a drag torque during coast due to friction and pumping losses. Using the engine to slow the vehicle is commonly called engine braking. In an electrified vehicle, coast presents an opportunity to charge the traction battery by operating the electric machine as a generator.

SUMMARY

According to one embodiment, a vehicle includes a traction battery and a powertrain. The powertrain including at least one traction motor electrically connected to the battery such that the traction motor discharges the battery when producing positive torque to propel the vehicle and recharges the battery when producing negative torque to slow the vehicle. A vehicle controller is programmed to execute coast (lift-pedal) controls in response to the vehicle coasting with accelerator and brake pedals being released. The coast controls include, in response to and as long as a ratio of energy capacity of the battery to kinetic energy of the vehicle is greater than or equal to one, command a baseline lift-pedal torque to the powertrain to slow the vehicle and charge the traction motor at a first rate. The controls further include, in response to and as long as the ratio is less than one, command a battery-based lift-pedal torque to the powertrain to slow the vehicle and charge the traction motor at a second rate that is less than the first rate, wherein the battery-based lift-pedal torque has a magnitude that is equal to the baseline torque multiplied by the ratio.

According to another embodiment, a hybrid vehicle includes a traction battery and a powertrain having an internal combustion engine and a traction motor electrically connected to the battery. The traction motor discharges the battery when producing positive torque to propel the vehicle and recharges the battery when producing negative torque to slow the vehicle. A controller is programmed to execute coast (lift-pedal) controls in response to the vehicle coasting with accelerator and brake pedals being released. The coast controls include, in response to and as long as a ratio of energy capacity of the battery to kinetic energy of the vehicle is greater than or equal to one, command a baseline lift-pedal torque to the powertrain to slow the vehicle and charge the traction motor at a first rate. The coast controls further include, in response to and as long as the ratio is less than one, command a modified lift-pedal torque to slow the vehicle and charge the traction motor at a second rate that is less than the first rate, wherein the modified lift-pedal torque is based on the ratio and friction torque of the engine.

According to yet another embodiment, a vehicle includes a traction battery and a powertrain. The powertrain including at least one traction motor electrically connected to the battery such that the traction motor discharges the battery when producing positive torque to propel the vehicle and recharges the battery when producing negative torque to slow the vehicle. A vehicle controller is programmed to execute coast (lift-pedal) controls in response to the vehicle coasting with accelerator and brake pedals being released. The coast controls include, responsive to a state of charge of the battery (battery SOC) exceeding a threshold, command a base-line lift-pedal torque to slow the vehicle and charge the traction motor at a first rate. The controls further include, responsive to the battery SOC being less than the threshold, command a modified lift-pedal torque to the powertrain to slow the vehicle and charge the traction motor at a second rate that is less than the first rate, wherein the magnitude of the modified lift-pedal torque is equal to the product of the base-line lift-pedal torque and a scaling factor.

BRIEF DESCRIPTION OF THE DRAWINGS

FIG. 4 is a flow chart of an algorithm for generating a lift-pedal torque for a hybrid vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
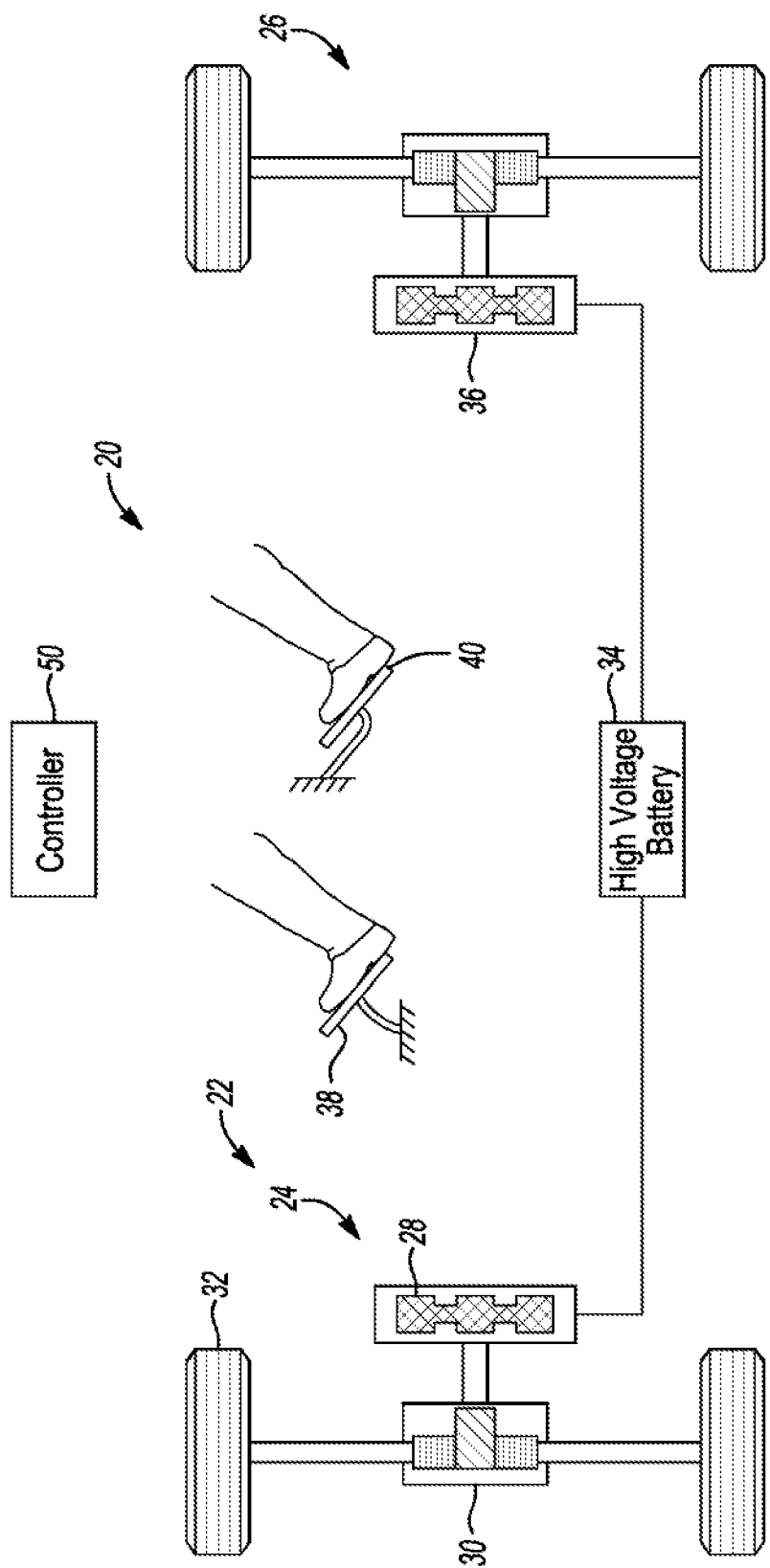
FIG. 1 is a schematic diagram of a fully electric vehicle according to one embodiment.

Referring to FIG. 1, an electrified vehicle 20 is illustrated according to an embodiment of the present disclosure. FIG. 1 illustrates representative relationships among the components. Physical placement and orientation of the components within the vehicle may vary. The vehicle 20 may include an electric powertrain 22 having front drive unit 24 and a rear drive unit 26. The electric powertrain 22 is powered by a traction battery 34. The front drive unit 24 includes a front traction motor 28 coupled to a differential 30. The differential 30 routes torque produced by the motor 28 to the front driven wheels 32. The motor 28 may be implemented by any one of a plurality of types of electric machines. For example, motor 28 may be a permanent magnet synchronous motor. Power electronics condition direct current (DC) power provided by the battery 34 to the requirements of the motor 28. For example, power electronics may provide three-phase alternating current (AC) to the motor 28. The motor(s) are configured to act as motors to accelerate the vehicle 20 and as generators to slow down the vehicle and charge the battery 34. The rear drive unit 26 may be similarly to the front drive unit 24.

The vehicle further includes one or more controllers 50. While illustrated as one controller, the controller 50 may be part of a larger control system and may be controlled by various other controllers throughout the vehicle 20, such as a vehicle system controller (VSC). It should therefore be understood that the controller 50 and one or more other controllers can collectively be referred to as a "controller" that controls various actuators in response to signals from various sensors to control functions such as operating motors 28, 36 to provide wheel torque or charge the battery 34. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and from the electric motors 28, 36, the traction battery 34, an accelerator pedal 38, a brake pedal 40, and others. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include battery charging, regenerative braking, lift-pedal torque, motor operation, and the like. Sensors communicating input through the I/O interface may be used to indicate wheel speeds, motor speed, vehicle speed, accelerator pedal position, brake pedal position, battery SOC, for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The accelerator pedal 38 is used by the driver of the vehicle to provide a driver-demanded torque to propel the vehicle. In general, depressing and releasing the pedal 38 causes a pedal-position sensor to generate an accelerator pedal position signal that may be interpreted by the controller 50 as a demand for increased power or decreased power, respectively. Based at least upon input from the pedal 38, the controller 50 commands torque from the one or more motors.

To drive the vehicle with the motors 28 and/or 36, the traction battery 34 transmits stored electrical energy of the battery 34 through wiring to power electronics (not shown) that may include an inverter. The power electronics convert DC voltage from the battery 34 into AC voltage to be used by the motor(s). The controller 50 commands the power electronics to convert voltage from the battery 34 to an AC voltage provided to the motor(s) to provide positive torque (drive torque) or negative torque (regenerative braking or lift-pedal torque).

The motors 28, 36 may act as motors and provide a driving force for the vehicle 20. Alternatively, the motors 28, 36 may act as generators and convert kinetic energy from the vehicle 20 into electric energy to be stored in the battery 34. The motors 28, 36 may act as generators when it is desirable to slow the vehicle. When acting as generators, rotational energy from the spinning wheels is transferred back through the drive units 24, 26 and is converted into electrical energy for storage in the battery 34. The motors 28, 36 may be referred to as providing negative torque when acting as a generator and positive torque when acting as motors.

It should be understood that the fully electric vehicle illustrated in FIG. 1 is merely exemplary and is not intended to be limited. Other configurations are contemplated such as single drive units, in-wheel motors, and hybrid vehicles.

When the driver of a moving vehicle releases the accelerator pedal 38, the vehicle begins to coast and remains in coast until the driver applies either the brake pedal 40 which begins braking or the accelerator pedal 38 which resumes propulsion. The vehicle 20 may be configured to operate the one or more traction motors 28, 36 as generators to charge the traction battery 34 during coast. That is, the controller 50 may command a negative torque (drag torque) during coast. Used herein, the negative torque applied during coast is referred to as "lift-pedal torque." The vehicle 20 may command a lift-pedal torque in response to the vehicle moving and the accelerator 38 and brake 40 pedals being released. The lift-pedal torque may be a function of vehicle speed. Generally, the lift-pedal torque increases (more negative) as vehicle speed increases and the lift-pedal torque decreases as vehicle speed decreases. The lift-torque can be calibrated to provide similar feel to engine braking or can be more aggressive to facilitate one-pedal driving.

Similar to regenerative braking, the motors 28, 36 can only produce a lift-pedal torque when the traction battery 34 has capacity for accepting additional charge. As the state of charge of the battery (battery SOC) nears 100 percent the ability of the motors to provide a lift-torque diminishes and eventually ends. To prevent the sudden loss of lift-pedal torque during a coasting event due to high battery SOC, the controller 50 may be programmed to phase out (gradually reduce) the lift-pedal torque as the battery nears full charge. This may extend the duration of the lift-pedal torque as well as reduce the driver's ability to perceive the eventual loss of lift-pedal torque once the battery is fully charged. (Fully charged does not necessarily mean 100 percent as the vehicle may be designed to limit the battery to artificial upper and lower charge thresholds.)

Figure 2:
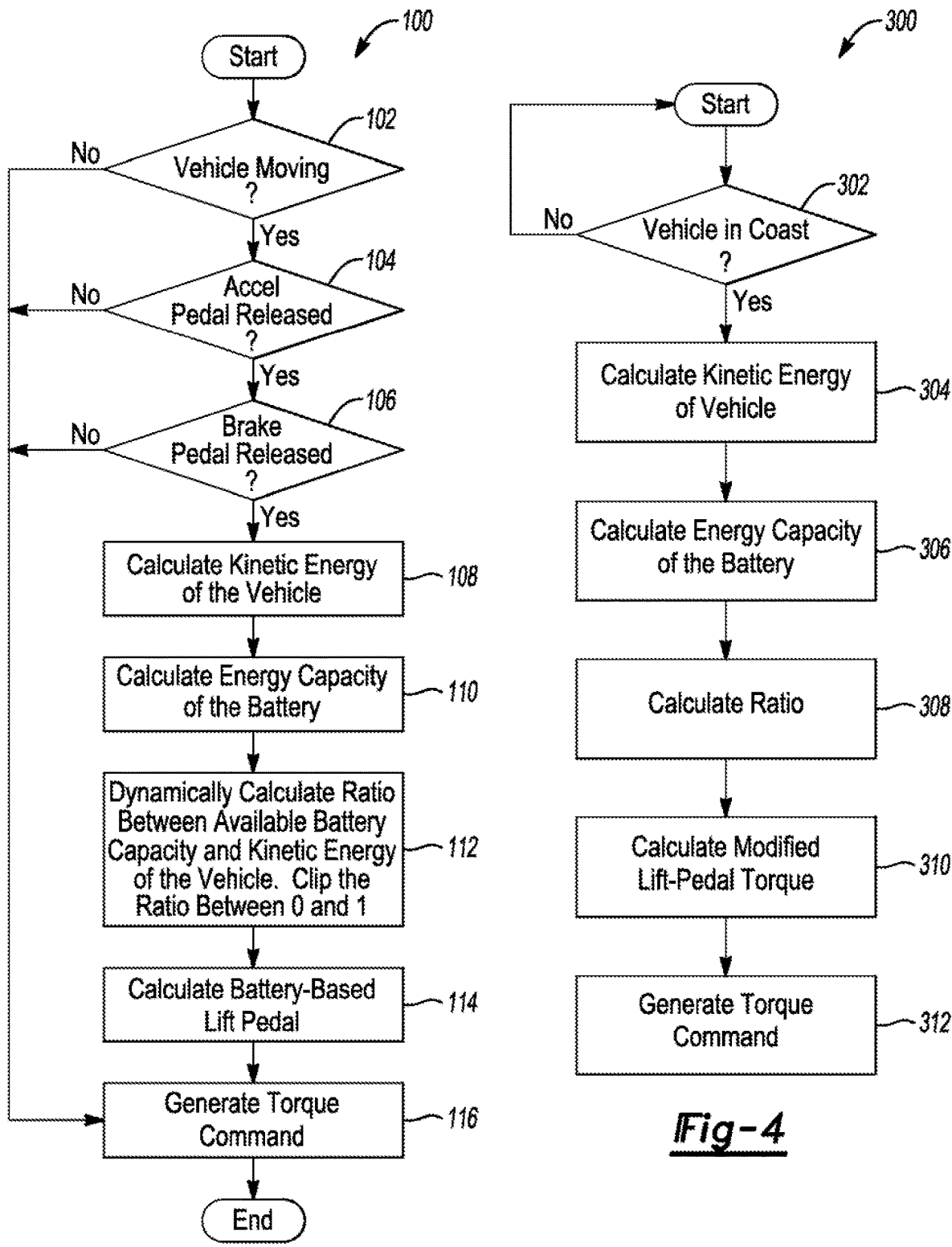
FIG. 2 is a flow chart of an algorithm for generating a lift-pedal torque for an electrified vehicle.

FIG. 2 illustrates a flow chart 100 of an algorithm for controlling an electrified vehicle during coast. Control begins at operation 102 where the controller determines if the vehicle is moving. The vehicle includes a plurality of sensors such as wheel-speed sensors, motor-speed sensors, transmission-speed sensors in electric communication with the controller. Based on signals from one or more of the sensors, the controller can determine the speed of the vehicle. If the vehicle is not moving control ends. If the vehicle is moving, control passes operation 104 and the controller determines if the accelerator pedal is released. If yes, control passes to operation 106 and the controller determines if the brake pedal is released. If yes at operation 106, the controller has determined that the vehicle is in coast. Control ends if no at operations 104 or 106.

Operations 104 through 106 are used to determine if the vehicle is in coast. Once the vehicle is determined to be in coast, the controller next determines the appropriate lift-pedal torque. The controller may include a lookup table stored in memory. The lookup table includes a plurality of lift-pedal torques to be used in different driving situations. For example, the lookup table may include a plurality of lift-pedal torques for different vehicle speeds. The lift-pedal torque stored in the lookup table are called baseline lift-pedal torques. The baseline lift-pedal torques do not consider battery SOC. Generally, the baseline torques are used when battery has sufficient capacity. When the battery is estimated to have insufficient capacity for providing the baseline lift-pedal torques for a coasting event, the vehicle may calculate a modified lift-pedal torque based on the battery state of charge. This modified lift-pedal torque may be referred to as "battery-based lift-pedal torque" in some embodiments. The following operations of the flow chart 100 provide one example of calculating a battery-based lift-pedal torque.

The battery-based lift-pedal torque may be based on a ratio between the kinetic energy of the vehicle ($K_e$) and the available energy capacity of the battery ($E_{batt}$). At operation 108, the kinetic energy of the vehicle is calculated using equation 1, where $M_{veh}$ is mass of the vehicle and $V_{veh}$ is velocity of the vehicle.

$$K_e = 0.5 M_{veh}(V_{veh})^2 \qquad \text{Eq. (1)}$$

At operation 110, the controller determines the maximum energy that can be recuperated by the battery, i.e., the available battery capacity is calculated based on the present battery SOC. Equation 2 may be used to calculate the available energy capacity of the battery ($E_{batt}$), where $E_{max}$ is the energy rating of the battery, e.g., 100 kilowatt hours.

$$E_{batt} = (1 - \text{Battery SOC}) * E_{max} \qquad \text{Eq. (2)}$$

At operation 112, the controller calculates the ratio (rt) between $E_{batt}$ and $K_e$ using equation 3. The ratio (rt) may be clipped to be between zero and one. The ratio (rt) is limited to a maximum value of one so that the battery-based lift-pedal torque never exceeds the baseline lift-pedal torque.

$$rt = \text{clip}\left(0, \left(\frac{E_{batt}}{K_e}\right), 1\right) \qquad \text{Eq. (3)}$$

At operation 114, the controller calculates the battery-based lift-pedal torque using equation 4, where $\tau_{base}$ is the baseline lift-pedal torque and $\tau_{batt}$ is the battery-based lift-pedal torque. At operation 114, the controller selects the appropriate baseline torque from the lookup table for the current conditions and multiplies it by the ratio calculated in operation 112 to obtain the battery-based lift-pedal torque. As can be seen from equation 4, $\tau_{base}$ and $\tau_{batt}$ are equal if the ratio is 1. That is, when $E_{batt}$ divided by $K_e$ is greater than or equal to one, the baseline torque is used.

$$\tau_{batt} = \tau_{base} * rt \qquad \text{Eq. (4)}$$

At operation 116, the controller determines which lift-pedal torque to use and commands that lift-pedal torque to the powertrain, e.g., the one or more electric machines. The controller is programmed to select the maximum (less negative) of $\tau_{base}$ and $\tau_{batt}$. If the ratio of energy capacity of the battery to kinetic energy of the vehicle is greater than or equal to one, the controller commands a baseline lift-pedal torque to the powertrain. If the ratio is less than one, the controller commands a battery-based lift-pedal torque to the powertrain. The commanded lift pedal torque may be commanded to an arbitrator that is part of the controller or another controller. The arbitrator, if provided, is responsible for receiving powertrain torque commands, such as the driver-demanded torque and the lift-pedal torque, and splitting that commanded torque among the electric motor(s) and/or an engine. Here, the arbitrator receives the lift-pedal torque and then commands individual torques to the one or more electric machines. The torque may be commanded to the electric machines in the form of current and/or voltage commands.

The above algorithm may be modified to ensure the rate (rt) remains monotonic (the rate does not increase) for a given coasting event. According to one embodiment, the above equations 3 and 4 are substituted for equations 3a and 4a as shown below, where k is the time index.

$$\widehat{rt}_k = \min(rt_k, rt_{k-1}) \qquad \text{Eq. (3a)}$$

$$\tau_{lift}^{dyn} = \tau_{lift}^{CAL} * \widehat{rt}_k \qquad \text{Eq. (4a)}$$

Figure 3:
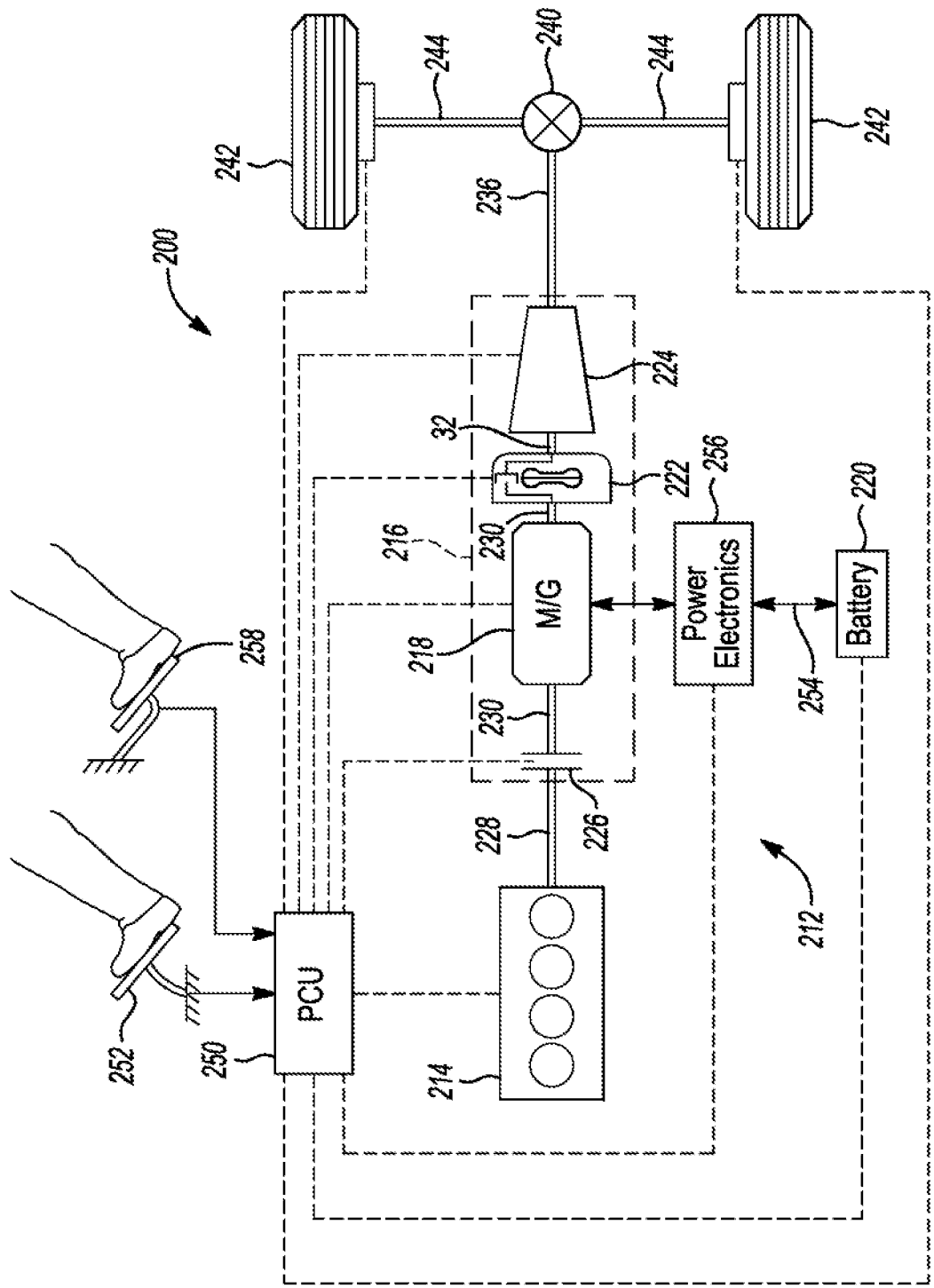
FIG. 3 is a schematic diagram of a hybrid-electric vehicle according to one embodiment.

Referring to FIG. 3, the vehicle may be a hybrid vehicle in other embodiments. A schematic diagram of a hybrid electric vehicle (HEV) 200 is illustrated according to an embodiment of the present disclosure. FIG. 3 illustrates representative relationships among the components. Physical placement and orientation of the components within the vehicle may vary. The HEV 200 includes a powertrain 212. The powertrain 212 includes an engine 214 that drives a transmission 216, which may be referred to as a modular hybrid transmission (MHT). As will be described in further detail below, transmission 216 includes an electric machine such as an electric motor/generator referred to herein as motor 218, an associated traction battery 220, a torque converter 222, and a multiple step-ratio automatic transmission, or gearbox 224. The engine 214, motor 218, torque converter 222, and the automatic transmission 216 are connected sequentially in series, as illustrated in FIG. 3.

The engine 214 and the motor 218 are both drive sources for the HEV 200. The engine 214 generally represents a power source that may include an internal combustion engine such as a gasoline, diesel, or natural gas powered engine, or a fuel cell. The engine 214 generates an engine power and corresponding engine torque that is supplied to the motor 218 when a disconnect clutch 226 between the engine 214 and the motor 218 is at least partially engaged. The motor 218 may be implemented by any one of a plurality of types of electric machines. For example, motor 218 may be a permanent magnet synchronous motor. Power electronics condition direct current (DC) power provided by the battery 220 to the requirements of the motor 218, as will be described below. For example, power electronics may provide three phase alternating current (AC) to the motor 218.

When the disconnect clutch 226 is at least partially engaged, power flow from the engine 214 to the motor 218 or from the motor 218 to the engine 214 is possible. For example, the disconnect clutch 226 may be engaged and motor 218 may operate as a generator to convert rotational energy provided by a crankshaft 228 and M/G shaft 230 into electrical energy to be stored in the battery 220. The disconnect clutch 226 can also be disengaged to isolate the engine 214 from the remainder of the powertrain 212 such that the motor 218 can act as the sole drive source for the HEV 200. Shaft 230 extends through the motor 218. The motor 218 is continuously, drivably connected to the shaft 230, whereas the engine 214 is drivably connected to the shaft 230 only when the disconnect clutch 226 is at least partially engaged.

The output shaft 236 is connected to a differential 240. The differential 240 drives a pair of wheels 242 via respective axles 244 connected to the differential 240. The differential transmits approximately equal torque to each wheel 242 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 212 further includes an associated controller 250 such as a powertrain control unit (PCU). While illustrated as one controller, the controller 250 may be part of the VSC.

An accelerator pedal 252 is used by the driver of the vehicle to provide a driver-demanded torque as described above. The vehicle 200 also includes a brake pedal 258. The pedal 258 may be similar to brake pedal 40 described above. Based at least upon input from the pedal 252, the controller 250 commands torque from the engine 214 and/or the motor 218. To drive the vehicle 200 with the engine 214, the disconnect clutch 226 is at least partially engaged to transfer at least a portion of the engine torque through the disconnect clutch 226 to the motor 218, and then from the motor 218 through the torque converter 222 and gearbox 224. When the engine 214 alone provides the torque necessary to propel the vehicle, this operation mode may be referred to as the "engine mode," "engine-only mode," or "mechanical mode." The motor 218 may assist the engine 214 by providing additional power to turn the shaft 230. This operation mode may be referred to as a "hybrid mode," an "engine-motor mode," or an "electric-assist mode."

To drive the vehicle with the motor 218 as the sole power source, the power flow remains the same except the disconnect clutch 226 isolates the engine 214 from the remainder of the powertrain 212. Combustion in the engine 214 may be disabled or otherwise OFF during this time to conserve fuel. The traction battery 220 transmits stored electrical energy through wiring 254 to power electronics 256 that may include an inverter, for example. This operation mode may be referred to as an "electric only mode," "EV (electric vehicle) mode," or "motor mode."

In any mode of operation, the motor 218 may act as a motor and provide a driving force for the powertrain 212. Alternatively, the motor 218 may act as a generator and convert kinetic energy from the powertrain 212 into electric energy to be stored in the battery 220. The motor 218 may act as a generator while the engine 214 is providing propulsion power for the vehicle 200, for example. The motor 218 may additionally act as a generator during times of regenerative braking and during coast (lift-pedal torque) in which rotational energy from spinning wheels 242 is transferred back through the gearbox 224 and is converted into electrical energy for storage in the battery 220.

It should be understood that the schematic illustrated in FIG. 3 is merely exemplary and is not intended to be limited. Other configurations are contemplated that utilize selective engagement of both an engine and a motor to transmit through the transmission. For example, the motor 218 may be offset from the crankshaft 228, and/or the motor 218 may be provided between the torque converter 222 and the gearbox 224. Other configurations, such as power split, are contemplated without deviating from the scope of the present disclosure.

The hybrid vehicle 200 is configured to apply a lift-pedal torque during coast. The lift-pedal torque controls may be similar to the above-described controls 100 but controls of the hybrid vehicle 200 take the engine friction torque into account. Unlike fully electric vehicles, the engine of the hybrid vehicle 200 can be used to generate a lift-pedal torque when the battery is fully charged.

Referring to FIG. 4, a flow chart 300 of an algorithm for controlling an electrified vehicle during coast. Control begins at operation 302 where the controller 250 determines if the vehicle is in coast as described above. If the vehicle is determined to be in coast, the controller next determines the appropriate lift-pedal torque. The controller may include a lookup table stored in memory. The lookup table includes a plurality of baseline lift-pedal torques to be used in different driving situations.

At operation 304, the kinetic energy of the vehicle is calculated using equation 1. At operation 306, the controller determines the maximum energy that can be recuperated by the battery using equation 2. At operation 308, the controller calculates the ratio (rt) between $E_{batt}$ and $K_e$ using equation 3.

At operation 310, the controller calculates a modified lift-pedal torque ($\tau_{mod}$) using equation 5. Equation 5 is similar to equation 4, but takes the engine friction torque ($\tau_{eng\_fric}$) into account. At operation 310, the controller selects the appropriate baseline torque from the lookup table for the current vehicle speed. When $E_{batt}$ divided by $K_e$ is greater than or equal to one, the baseline torque is used as the $\tau_{eng\_fric}$ terms cancel out.

$$\tau_{mod} = (\tau_{base} - \tau_{eng\_fric}) * rt + \tau_{eng\_fric} \qquad \text{Eq. (5)}$$

At operation 312, the controller determines which lift-pedal torque to use and commands that lift-pedal torque to the powertrain. As discuss above, the lift-pedal torque may be commanded to an arbitrator that divides the torque between the various actuators such as the motor 218 and/or the engine 214. The controller is programmed to select the maximum (less negative) of $\tau_{base}$ and $\tau_{mod}$. If the ratio of energy capacity of the battery to kinetic energy of the vehicle is greater than or equal to one, the controller commands the baseline lift-pedal torque. If the ratio is less than one, the controller commands a modified lift-pedal torque.

According to another embodiment, the lift-pedal torque may be based on battery SOC rather than a ratio of kinetic energy. Here, the vehicle still includes the above-described lookup table of baseline lift-pedal torques. If the battery SOC is above a calibratable threshold, such as 90%, a scaling factor, f(SOC), is used to reduce the baseline lift-pedal torque. That is, the controller is programmed to command a baseline lift-pedal torque to the powertrain if the battery SOC is less than the threshold, and to command a modified lift-pedal torque to the powertrain if the battery SOC is greater than the threshold. The modified lift-pedal torque may be calculated using equation 6. The scaling factor is less than one and reduces the baseline torque. The scaling factor decreases as battery SOC decreases to phase-out the lift-pedal torque to provide a progressive loss of lift-pedal torque over multiple lift-pedal events.

$$\tau_{mod} = f(SOC) * \tau_{base} \quad \text{Eq. (6)}$$

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery;
a powertrain including at least one traction motor electrically connected to the battery such that the traction motor discharges the battery when producing positive torque to propel the vehicle and recharges the battery when producing negative torque to slow the vehicle; and
a controller programmed to, in response to the vehicle coasting with accelerator and brake pedals being released:
in response to and as long as a ratio of energy capacity of the battery to kinetic energy of the vehicle is greater than or equal to one, command a baseline lift-pedal torque to the powertrain to slow the vehicle; and
in response to and as long as the ratio is less than one, command a battery-based lift-pedal torque, that is less than the baseline lift-pedal torque, to the powertrain to slow the vehicle, wherein the battery-based lift-pedal torque has a magnitude that is equal to the baseline lift-pedal torque multiplied by the ratio.

2. The vehicle of claim 1, wherein the energy capacity of the battery is based on state of charge of the battery and a predetermined energy rating of the battery.

3. The vehicle of claim 1, wherein the kinetic energy is equal to one half of the mass of the vehicle multiplied by a square of velocity of the vehicle.

4. The vehicle of claim 1, wherein the baseline lift-pedal torque is based on vehicle speed.

5. The vehicle of claim 1, wherein the powertrain further includes an internal combustion engine having an associated friction torque based on speed of the engine, wherein the battery-based lift-pedal torque commanded to the powertrain is based on the friction torque.

6. The vehicle of claim 5, wherein the battery-based lift-pedal torque increases as the friction torque increases, and the battery-based lift-pedal torque decreases as the friction torque decreases.

7. A hybrid vehicle comprising:
a traction battery;
a powertrain including an internal combustion engine and a traction motor electrically connected to the battery, wherein the traction motor discharges the battery when producing positive torque to propel the vehicle and recharges the battery when producing negative torque to slow the vehicle; and
a controller programmed to, in response to the vehicle coasting with accelerator and brake pedals being released:
in response to and as long as a ratio of energy capacity of the battery to kinetic energy of the vehicle is greater than or equal to one, command a baseline lift-pedal torque to the powertrain; and
in response to and as long as the ratio is less than one, command a modified lift-pedal torque that is less than the baseline lift pedal torque, wherein the modified lift-pedal torque is equal to the difference between the baseline lift-pedal torque and friction torque of the engine multiplied by the ratio, plus the friction torque.

8. The hybrid vehicle of claim 7, wherein the modified lift-pedal torque is a product of the baseline lift-pedal torque and the ratio.

9. The hybrid vehicle of claim 7, wherein the baseline lift-pedal torque is based on vehicle speed.

10. The hybrid vehicle claim 7, wherein the energy capacity of the battery is a product of state of charge of the battery and a predetermined energy rating of the battery.

11. The hybrid vehicle claim 7, wherein the kinetic energy is equal to one half of the mass of the vehicle multiplied by a square of velocity of the vehicle.

12. The vehicle of claim 7, wherein the modified lift-pedal torque increases as the friction torque increases and decreases as the friction torque decreases.

13. A vehicle comprising:
a traction battery;
a powertrain including at least one traction motor electrically connected to the battery such that the traction motor discharges the battery when producing positive torque to propel the vehicle and recharges the battery when producing negative torque to slow the vehicle; and a controller programmed to, in response to the vehicle coasting with accelerator and brake pedals being released;

responsive to a state of charge of the battery (battery SOC) being less than a threshold, command a baseline lift-pedal torque to slow the vehicle at a first rate, and responsive to the battery SOC being greater than the threshold, command a modified lift-pedal torque, that is less than the baseline lift-pedal torque, to the powertrain to slow the vehicle at a second rate that is less than the first rate, wherein the magnitude of the modified lift-pedal torque is equal to the product of the baseline lift-pedal torque and a scaling factor, wherein the scaling factor decreases as the battery SOC decreases.

14. The vehicle of claim 13, wherein the threshold is greater than 90 percent.

15. The vehicle of claim 13, wherein the scaling factor is less than one.

\* \* \* \* \*